April 22, 1947.  J. F. STEIGERWALD  2,419,297
LAPPING TOOL
Filed Sept. 12, 1945
Fig. 1.
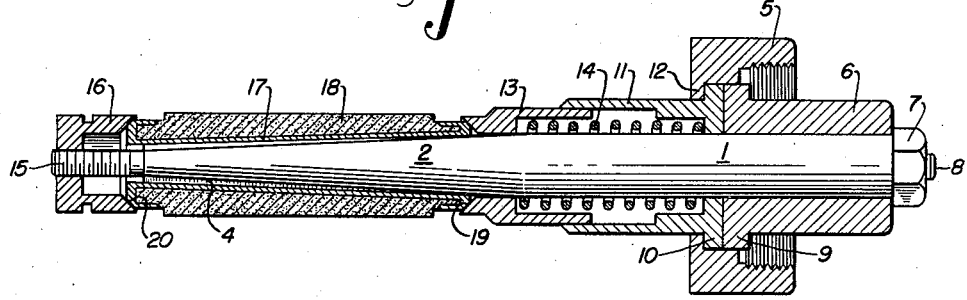
Fig. 2.
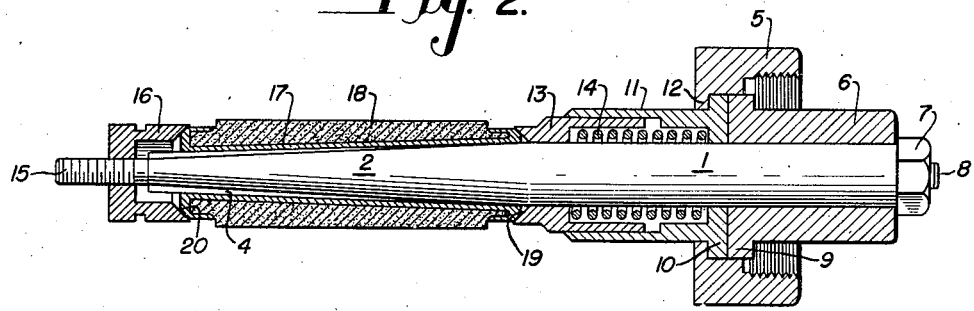
Fig. 3.
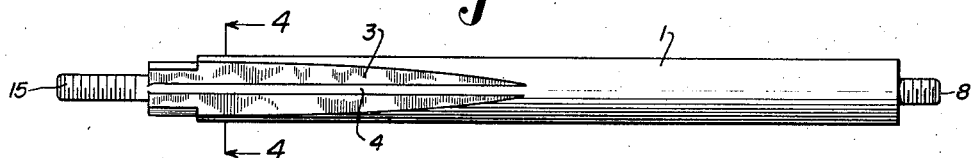
Fig. 4.
Fig. 5.
INVENTOR
JOSEPH F. STEIGERWALD
BY
Frank H. Harmon
ATTORNEY Patented Apr. 22, 1947

2,419,297

UNITED STATES PATENT OFFICE 2,419,297

LAPPING TOOL

Joseph F. Steigerwald, Shaker Heights, Ohio, assignor, by mesne assignments, to Jack & Heintz Precision Industries, Inc., Cleveland, Ohio, a corporation of Delaware Application September 12, 1945, Serial No. 615,752

2 Claims. (Cl. 51—184.3)

This invention relates in general to tools and has for one of its primary objects to provide an improved lapping tool, or the like, wherein the lapping stones may be readily removed, and when installed be firmly gripped and held against any relative movement with respect to the tool and also wherein the overall outside diameter of the lapping stones may be readily uniformly varied uniformly throughout their length.

With the foregoing and other objects in view the invention resides in the combination of parts and in the details of construction hereinafter set forth in the following specification and appended claims, certain embodiments thereof being illustrated in the accompanying drawings in which:

Figure 1 is a view in longitudinal section through the chuck, tool and lapping stones of the tool, the spindle thereof being shown in side elevation, the stones being shown gripped by the tool and the latter being extended to maintain a minimum overall outside diameter for the stones;

Figure 2 is a similar view, showing the tool adjusted to provide an increased overall outside diameter for the stones;

Figure 3 is a view in side elevation of the spindle taken at right angles to the showing thereof in Figures 1 and 2;

Figure 4 is a view in section taken through the spindle along lines 4—4 of Figure 3; and Figure 5 is a view in side elevation of the interior of one of the stones.

Tools of the general character shown in the drawings employing removable stones for lapping and other purposes have been previously employed but the retaining and adjustable expanding means employed have been uniformly inefficient and unsatisfactory. This is because being complicated they fail to firmly maintain the stones against relative movement with respect to the holder and also fail to provide for expansion and contraction of the overall outside diameter throughout their lengths when the holder is adjusted for that purpose.

Referring more particularly to the drawings, the spindle 1 has a tapered portion 2 progressively decreasing in diameter from right to left as viewed in Figures 1, 2 and 3, the tapered portion of the spindle being provided for by flattened surfaces 3 on opposite sides. In the middle of each flattened surface is a spline 4 that progressively increases in height from right to left.

The tool holding chuck includes a collar 5 to receive a bushing 6 through which the spindle extends to be removably secured by a nut 7 engaging one screw-threaded end 8 of the spindle. The inner end of bushing 6 is flanged at 9 to abut a flange 10 of a hollow sleeve 11 and the tightening of nut 7 aligns the hollow sleeve 11 as its flange 10 is compressed between flange 9 and the inwardly extending flange 12 of collar 5. Slidably arranged inside of hollow sleeve 11 is another hollow sleeve 13. The two hollow sleeves are normally maintained in extended telescopic relationship by means of an internally positioned compression coil spring 14. The opposite end of the spindle also has a screw threaded extension 15 of reduced diameter to be engaged by an especially designed nut 16.

One of the lapping, or metal finishing abrasive stones is shown in Figures 1, 2 and 5 as an elongated member of segmental cross section tapered longitudinally in thickness. It comprises a metallic body 17 with an exterior coating 18 of abrasive material, generally referred to as a stone, and extending the major portion of the length of the metallic body but leaving a certain length of the two end portions thereof uncovered. The opposing inner surfaces of sleeve 13 and nut 16 are bevelled at 19 and 20 respectively to receive the ends of the metallic body 17.

With the spindle and sleeve 11 held in the chuck, and sleeve 13, spring 14 and nut 16 assembled in their positions shown in Figure 1, the inner sleeve 13 is moved to the right against the action of spring 14 to increase the distance between sleeve 13 and nut 16. Each abrasive member is provided with a longitudinal groove 21 in the inner surface of its metal body portion 17. These abrasive members are placed to have their grooves 21 engage splines 4 to insure against relative rotational movement between the abrasive members and the spindle. The abrasive members are then slid to the left so that their metallic ends fit snugly under the bevelled internal surface 20 of the special adjustable nut 16. Longitudinal pressure on sleeve 13 is then released and spring 14 then forces it to the left to have its bevelled inner surface 19 engage the other end of the metallic body 17.

The tapers of the metallic body and its abrasive coating and that of the spindle are preferably so correlated as to provide for the two abrasive bodies 18 to be of uniform overall outside diameter. This is true whether nut 16 is adjusted to maintain the holder in the extended position of Figure 1 or adjusted to retract the same to the position of Figure 2, in which latter the overall outside diameter of the abrasive body, or stone, is uniformly increased. In any of the infinite number of adjusted positions the engagement of splines 4 with grooves 21 prevents relative rotational movement. Moreover, the two ends of the abrasive element are resiliently and firmly maintained flat against the flat surfaces 3 of the spindle and the two ends of the abrasive members are firmly maintained against radial movement, flatwise or pivotal. In addition to the advantageous features is that of simplicity of design and ready installation and removal of the stones.

I claim:

1. In an abrasive tool having a spindle, a pair of telescopic sleeves one of which is held stationary on the spindle and the other normally resiliently forced away therefrom longitudinally in extended position, an adjustable end nut on said spindle, said spindle having flattened portions on either side thereof to taper inwardly toward said nut end, a spline centrally located on each flat portion formed to progressively increase in height toward said nut end, a pair of abrasive units each formed of a metallic body of segmental cross section with an inner groove to fit one of said spindle splines and having abrasive coatings intermediate their ends, the abrasive units when inserted between said nut and movable sleeve on said spindle being tapered to increase in thickness toward said nut end to be of substantially uniform overall outside diameter throughout their lengths as said adjustable nut is adjusted to increase or decrease the overall diameter of the effective abrasive portion of said tool, resilient means normally urging said abrasive units against said nut and in position to be retained on said spindle, said abrasive units being manually slidable on said spindle against the action of said resilient means away from said nut so as to be removable without disassembly of the nut or resilient means.

2. In an abrasive tool having a spindle, a pair of telescopic sleeves one of which is held stationary on the spindle and the other normally resiliently forced away therefrom longitudinally in extended position, an adjustable end nut on said spindle, said spindle having flattened portions on either side thereof to taper inwardly toward said nut end, a spline centrally located on each flat portion formed to progressively increase in height toward said nut end, a pair of abrasive units each formed of a metallic body of segmental cross section with an inner groove to fit one of said spindle splines and having abrasive coatings intermediate their ends, the abrasive units when inserted between said nut and movable sleeve on said spindle being tapered to increase in thickness toward said nut end to be of substantially uniform overall outside diameter throughout their lengths as said adjustable nut is adjusted to increase or decrease the overall diameter of the effective abrasive portion of said tool, resilient means normally urging said abrasive units against said nut and in position to be retained on said spindle, said abrasive units being manually slidable on said spindle against the action of said resilient means away from said nut so as to be removable without disassembly of the nut or resilient means, said resilient means comprising a spring pressed plunger having a retaining lip to overlap the adjacent ends of said abrasive units.

JOSEPH F. STEIGERWALD.

REFERENCES CITED

The following references are of record in the file of this patent:

UNITED STATES PATENTS

| Number | Name | Date |
| --- | --- | --- |
| 2,302,207 | Gjertsen | Nov. 17, 1943 |
| 2,283,132 | Wommer | May 12, 1942 |